May 9, 1961          I. A. WILLIAMS          2,983,326

SCALE

Filed Nov. 18, 1957

INVENTOR.
Ivan A. Williams
BY Eugene P. Farley
Atty.

United States Patent Office 2,983,326
Patented May 9, 1961

2,983,326
SCALE

Ivan A. Williams, 4315 NE. 96th Ave., Portland, Oreg.

Filed Nov. 18, 1957, Ser. No. 697,018

4 Claims. (Cl. 177—127)

This invention relates to scales adapted particularly for out-of-door use.

For the purpose of determining the susceptibility of forests to conflagration, it has become recommended practice to suspend bone dry wood dowels (firesticks) weighing exactly 100 grams a predetermined distance from the ground at intervals throughout the forest. The dowels absorb moisture from the air to a degree which is commensurate with that at which the branches of the trees absorb moisture. Hence the amount of moisture in the dowels at a given time affords a measure of the dryness of the trees and gives an indication of the danger of forest fire.

To measure the amount of moisture in the dowels, it is necessary to have a scale from which the dowel may be suspended and which will give a direct reading of the moisture content of the dowel. Thus where the dowel originally weighs 100 grams when bone dry, any increase in weight above the 100 gram value indicates to the ranger or forester the amount of moisture which has been absorbed from the air by the dowel. For this application, it is apparent that the scale must be rugged (as determined by its ability to withstand the shock of being dropped upon concrete from a height of six feet); substantially accurate (to ¼ gram); resistant to corrosion; easily cleaned; substantially unaffected by wind and air currents; light and portable; and easily calibrated.

It is the general object of the present invention to provide a scale which meets the foregoing requirements and which accordingly is particularly well suited for outdoor use as in weighing firesticks, weighing fish and game, and in similar applications.

The manner in which the foregoing and other objects of this invention are accomplished will be apparent from the accompanying specification and claims, considered together with the drawings wherein like numerals of reference indicate like parts and wherein:

Figure 1:
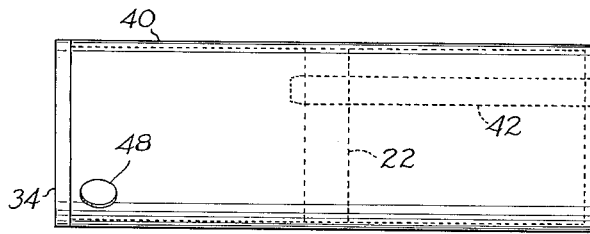
Fig. 1 is a view in side elevation of the herein described scale enclosed in its case.

Generally stated, the herein described scale comprises a scale beam, a knife edge mounting the beam, and resilient means mounting the knife edge which permit displacement of the same when the scale is subjected to impact, thereby preventing damage to the knife edge. The knife edge is centrally stationed with respect to the beam which carries the load on one of its ends and a counterweight on the other of its ends for balancing the load and weighing it. A case is provided which serves the ancillary but important function of a test weight for use in calibrating the scale as well as for use as a container in which objects may be weighed.

Considering the foregoing in greater detail and with particular reference to the drawings:

The scale of my invention includes a scale beam 10, the central portion of which is formed with a notch 12; the other end portion of which is formed with a notch 14; and the inner end portion of which is threaded.

The scale beam is supported centrally on a knife edge 16 provided with a pair of upwardly extending tabs 18 between which nests the scale beam. The heads of a pair of screws 20 overlie the knife edge serving as restraining and guiding members only and not as clamping members for clamping the knife edge to a support member 22 which receives the screws.

The knife edge thus is mounted for vertical movement and is retained resiliently in position bearing against screws 20 by spring means which in the illustrated embodiment comprises the reversely bent wire spring 24, insertable in a slotted opening 26 in structural member 22.

Several features are to be noted in connection with the foregoing construction. First, in contradistinction to conventional knife edge scales, the knife edge is carried by the support member and not by the beam. This makes possible the required rugged construction.

Secondly, the knife edge is movable against the resiliency of spring 24. Hence if the scale is subjected to shock, or impact, the knife edge can give and thus is protected from damage.

Thirdly, spring 24 is readily removable. This makes the scale easily dis-assembled for cleaning or adjustment.

The outer end of the scale beam carries a hook 28 formed with an integral knife edge which works in notch 14 of the scale beam. The object to be weighed may be suspended from this hook.

The threaded inner end of the scale beam carries a counterweight 30 which balances and weighs the load. This counterweight is contained in a semi-circular plate 32 supported by member 22 and also by a stepped end plate 34 formed with a central inner recess 36. The threaded end of the beam extends into this recess, the side wall of which serves as an abutment to limit the swinging movement of the beam.

Plate 32 is formed with a longitudinal edge 38 which is calibrated to read in any given units, as in grams. Correspondingly, counterweight 30 is formed in the shape of a micrometer wheel calibrated in units which are divisions of the major units carried on the scale. Thus by turning counterweight 30 until the beam is in balance, the weight of the object being weighed may be determined simply by referring to the scale on plate 32 and that on counterweight 30.

The scale assembly is housed in a casing 40, one end of which is open and the other end of which is substantially closed, but provided with a restricted opening through which a screw 42 may be inserted. The casing is dimensioned so that it fits over the stepped portion of end plate 34.

Figure 2:
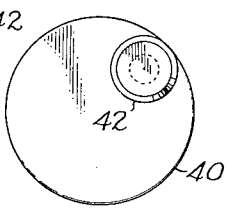
Fig. 2 is a view in end elevation of the scale enclosed as in Fig. 1.
Figure 3:
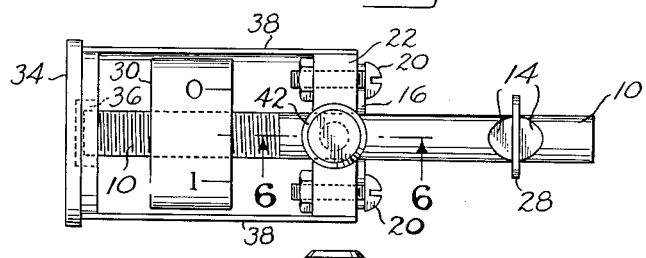
Figs. 3, 4 and 5 are plan, side and end elevation views, respectively, of the herein described scale with the case removed, assembled and ready for weighing.
Figure 6:
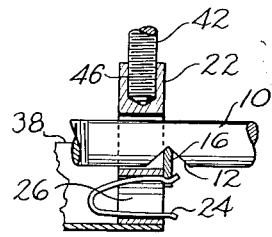
Fig. 6 is a detail fragmentary view taken along line 6—6 of Fig. 3 and illustrating particularly the manner of mounting the scale beam on the knife edge.
Figure 4:
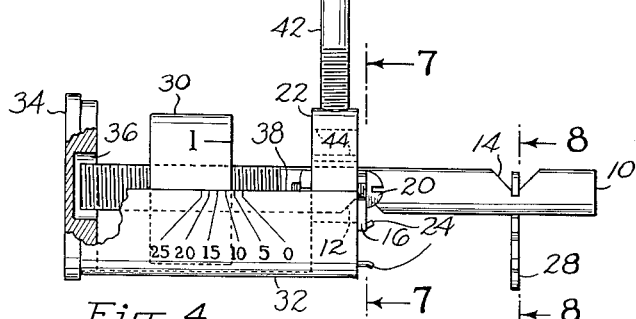
Figure 5:
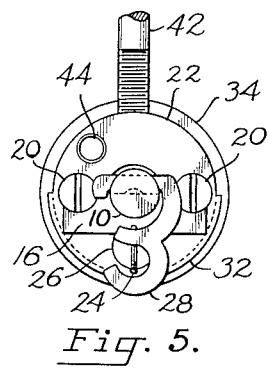
Figure 7:
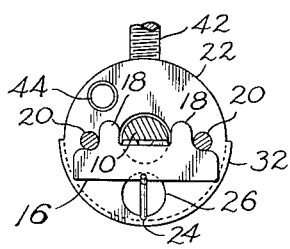
Fig. 7 is a sectional view taken along line 7—7 of Fig. 4 and further illustrating the beam on the knife edge.
Figure 8:
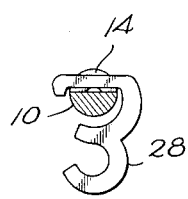
Fig. 8 is a detail sectional view taken along line 8—8 of Fig. 4.

Screw 42 is dimensioned to penetrate a threaded transverse opening 44 in structural member 22. Hence when the casing is slipped over the scale, as illustrated in Figs. 1 and 2, tightening of the screw locks the casing to the scale and brings the closed end of the casing and end plate 34 against the two ends of beam 10, clamping the beam firmly so that it will not rattle around inside the casing when the scale is being moved from place to place. However, when the casing has been removed, screw 42 may be inserted in a threaded radial opening 46 in member 22 and used as a handle for supporting the scale when an object is to be weighed, as indicated in Fig. 4.

Still further, casing 40 may be machined to a precise weight and provided with a marginal opening 48 by means of which it may be suspended from hook 28. Accordingly when the scale is to be used for the indicated purpose of weighing firesticks which, when dry, weigh exactly 100 grams, the casing may be machined to an exact weight of 100 grams. Then with the counterweight set on 0 and the casing suspended on hook 28, the entire system should be in balance. The casing thus may be used for checking the accuracy of the scale.

When the firestick is to be weighed, it is hung directly on hook 28 and counterweight 30 set until the scale is in balance. The reading of the scale then indicates the increase in weight of the firestick, i.e. the amount of moisture which it has absorbed, so that an accurate estimate may be made of the moisture condition of the forest.

Objects other than firesticks can, of course, be weighed by means of the presently described scale. Thus when casing 40 is suspended from the hook on the scale beam, an object to be weighed may be introduced into the casing and the system balanced. This will give a direct reading of the weight of the object. Also, fish, game, and other objects may be conveniently weighed if desired.

Thus it is apparent by the present invention I have provided a scale which is especially adapted for out-of-door use, being small, compact and easily carried and substantially unaffected by wind and dirt. In addition, the scale is resistant to corrosion, easily dis-assembled for repair and adjustment, and adapted to the weighing of objects of various classes.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A scale comprising a body member, a front supporting wall portion on the body member, a knife edge member slidably mounted for vertical movement on the wall portion, guide means on the knife edge member, guide means on the wall portion cooperating with the guide means on the knife edge member for guiding the latter in its vertical slidable movement and for limiting upward movement thereof, resilient support means for the knife edge member normally urging the latter upwardly to its upper limit position but permitting downward displacement thereof from its upper limit position in the event of an impact on the scale, a beam tiltably mounted on the knife edge member, means on one end of the beam for connecting to a load, and counterweight means on the opposite end of the beam for movement toward and away from the knife edge member to balance the load.

2. A scale comprising a body member, a front supporting wall portion on the body member, a knife edge member slidably mounted for vertical movement on the wall portion, a pair of laterally spaced, upwardly projecting tab means on the knife edge member, guide means on the wall portion cooperating with the tabs on the knife edge member for guiding the latter in its vertical slidable movement and for limiting upward movement thereof, spring support means for the knife edge member normally urging the latter upwardly to its limit position but permitting downward displacement thereof from its upper limit position in the event of an impact on the scale, a beam tiltably supported on the knife edge member, the beam having a threaded end portion disposed in the body member and having its opposite end projecting forwardly from the body member for connection to a load, and counterweight means threadedly mounted on the threaded end of the beam for rotative adjustment toward and away from the knife edge member to balance the load.

3. A scale comprising a body member, a front supporting wall portion on the body member, a beam tiltably mounted on the body member, means on one end of the beam for connecting to a load, counterweight means on the opposite end of the beam for balancing the load, the wall portion having a vertical threaded bore and a horizontal threaded bore, a removable casing for the scale having an end aperture, and a threaded handle member, said handle member being engageable with the vertical threaded bore when the casing is removed to suspend the scale and being engageable with the horizontal threaded bore and the end aperture of the casing for clamping the casing on the body member.

4. A scale comprising a body member, a beam tiltably mounted on the body member, load engaging means on one end of the beam, balance means on the opposite end of the beam having a selected set position, a casing for the body member, and means on the casing for connecting to the load engaging means upon removal of the casing from the body member, said casing being of a predetermined weight with relation to the weight of the balance means to check the accuracy of the scale upon setting the balance means on its said set position.

References Cited in the file of this patent

UNITED STATES PATENTS

| 347,056 | O'Neill | Aug. 10, 1886 |
| 600,979 | Mattice | Mar. 22, 1898 |
| 1,080,771 | Meyer | Dec. 9, 1913 |
| 1,298,138 | Witham | Mar. 25, 1919 |
| 1,635,508 | Shively | July 12, 1927 |
| 1,755,478 | Jaenichen | Apr. 22, 1930 |
| 1,949,721 | Klopsteg | Mar. 6, 1934 |
| 2,040,037 | Wily | May 5, 1936 |
| 2,396,462 | Grace et al. | Mar. 12, 1946 |
| 2,581,734 | Triplett | Jan. 8, 1952 |
| 2,584,873 | Hart et al. | Feb. 5, 1952 |
| 2,626,796 | Seederer et al. | Jan. 27, 1953 |
| 2,701,969 | Meredith | Feb. 15, 1955 |
| 2,785,570 | Mounteer et al. | Mar. 19, 1957 |
| 2,840,367 | Guss et al. | June 24, 1958 |

FOREIGN PATENTS

| 20,021 | Great Britain | Dec. 20, 1894 |
| 950,494 | France | Mar. 21, 1949 |
| 530,997 | Canada | Oct. 2, 1956 |